US006534177B2

United States Patent
Kohlhammer et al.

(10) Patent No.: US 6,534,177 B2
(45) Date of Patent: Mar. 18, 2003

(54) CROSSLINKABLE POLYMER COMPOSITION

(75) Inventors: Klaus Kohlhammer, Marktl (DE); Klaus Adler, Burghausen (DE); Herbert Eck, Bad Tölz (DE); Hermann Lutz, Emmerting (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/773,960

(22) Filed: Jan. 25, 2001

(65) Prior Publication Data

US 2001/0024644 A1 Sep. 27, 2001

(30) Foreign Application Priority Data

Feb. 1, 2000 (DE) .......................................... 100 04 319

(51) Int. Cl.7 ............................................... B32B 27/38
(52) U.S. Cl. ....................... 428/413; 428/510; 428/511; 523/401; 523/406; 523/410; 523/412; 523/413; 525/327.3; 525/330.3; 525/330.7; 525/331.9; 525/333.3
(58) Field of Search ................................ 523/401, 410, 523/406, 412, 413; 525/327.3, 330.3, 330.7, 331.9, 333.3; 428/413, 510, 511

(56) References Cited

U.S. PATENT DOCUMENTS 4,522,962 A * 6/1985 Abbey ........................ 523/410

FOREIGN PATENT DOCUMENTS

| EP | 0 721 004 | 7/1996 |
| WO | 93/22353 | 11/1993 |
| WO | 95/047767 | 2/1995 |

* cited by examiner

Primary Examiner—Robert Dawson
Assistant Examiner—D. Aylward
(74) Attorney, Agent, or Firm—Brooks & Kushman P.C.

(57) ABSTRACT

Crosslinkable polymer compositions are provided which can be in the form of a polymer powder which is redispersible in water or as an aqueous dispersion. The polymer composition is composed of A) a copolymer of one or more comonomers of vinyl esters of straight-chain or branched alkanecarboxylic acids having 1 to 18 C atoms, acrylates or methacrylates of branched or straight-chain alcohols having 1 to 15 C atoms, dienes, olefins, vinylaromatics and vinyl halides, and of from 0.1 to 10% by weight, based on the total weight of the comonomers, of one or more ethylenically unsaturated comonomers containing epoxide groups, and B) one or more non-copolymerizable compounds having at least two epoxide groups. The invention furthermore relates to a process for the preparation of the crosslinkable polymer compositions and their use in chemical products for the construction industry.

27 Claims, No Drawings

CROSSLINKABLE POLYMER COMPOSITION

BACKGROUND OF THE INVENTION

1) Field of the Invention

The present invention relates to crosslinkable polymer compositions in the form of their aqueous polymer dispersions or polymer powders redispersible in water, processes for their preparation and their use.

2) Background Art

The preparation of polymers containing epoxy groups by copolymerization of monomers containing epoxy groups is known. WO-A 95/04767 describes a process for the preparation of aqueous polymer dispersions or polymer powders obtainable therefrom, in which a hydrophobic copolymer optionally substituted by epoxy groups is prepared in the presence of a low molecular weight water-soluble polymer substituted by carboxyl groups. WO-A 93/22353 discloses the preparation of polymers in the form of their aqueous polymer dispersions or polymer powders redispersible in water, vinyl esters of branched carboxylic acids having 11 to 15 C atoms being copolymerized, inter alia, also with comonomers having epoxide functional groups, such as glycidyl methacrylate. EP-A 721004 relates to crosslinkable polymer powders which are redispersible in water and which are composed of a film-forming polymer component having functional groups, such as hydroxyl groups, and a crosslinking component, for example epoxy resins.

Common to all these processes is the fact that the second reactive component is not mixed with the polymer dispersion or with the polymer powder until after the preparation of the crosslinkable polymer. Although precrosslinking can thus be prevented, only low degrees of crosslinking and inhomogeneous products result in the case of poorly compatible components.

It was thus the object to provide crosslinkable polymer compositions which have a long shelf life and form homogeneous films with a high degree of crosslinking.

SUMMARY OF THE INVENTION

The invention relates to crosslinkable polymer compositions in the form of their aqueous polymer dispersions or polymer powders redispersible in water, containing A) a copolymer of one or more comonomers from the group consisting of vinyl esters of straight-chain or branched alkanecarboxylic acids having 1 to 18 C atoms, acrylates or methacrylates of branched or straight-chain alcohols having 1 to 15 C atoms, dienes, olefins, vinylaromatics and vinyl halides, and of from 0.1 to 10% by weight, based on the total weight of the comonomers, of one or more ethylenically unsaturated comonomers containing epoxide groups, and B) one or more non-copolymerizable compounds having at least two epoxide groups.

The invention furthermore relates to a process for the preparation of crosslinkable polymer compositions in the form of their aqueous polymer dispersions or polymer powders redispersible in water by emulsion polymerization of one or more comonomers from the group consisting of vinyl esters of straight-chain or branched alkanecarboxylic acids having 1 to 18 C atoms, acrylates or methacrylates of branched or straight-chain alcohols having 1 to 15 C atoms, dienes, olefins, vinylaromatics and vinyl halides, and of from 0.1 to 10% by weight, based on the total weight of the comonomers, of one or more ethylenically unsaturated comonomers containing epoxide groups, and optionally drying of the resulting polymer dispersions in the presence of one or more protective colloids, one or more non-copolymerizable compounds having at least two epoxide groups being added before, during or after the emulsion polymerization.

DESCRIPTION OF THE PREFERRED EMBODIMENTS

Suitable vinyl esters are vinyl esters of straight-chain or branched carboxylic acids having 1 to 18 atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 C atoms, for example VeoVa9$^R$ or VeoVa10$^R$ (trade names of Shell). Vinyl acetate is particularly preferred.

Suitable monomers from the group consisting of the esters of acrylic acid or methacrylic acid are esters of straight-chain or branched alcohols having 1 to 15 C atoms. Preferred methacrylates or acrylates are methyl acrylate, methyl methacrylate, ethyl acrylate, ethyl methacrylate, propyl acrylate, propyl methacrylate, n-butyl acrylate, n-butyl methacrylate, 2-ethylhexyl acrylate and norbornyl acrylate. Methyl acrylate, methyl methacrylate, n-butyl acrylate, 2-ethylhexyl acrylate and norbornyl acrylate are particularly preferred.

Suitable dienes are 1,3-butadiene and isoprene. Examples of copolymerizable olefins are ethene and propene. Vinylaromatics which can be polymerized are styrene and vinyltoluene. From the group consisting of the vinyl halides, vinyl chloride is usually used.

Optionally from 0.05 to 10% by weight, based on the total weight of the monomer mixture, of auxiliary monomers can also be copolymerized. Examples of auxiliary monomers are ethylenically unsaturated mono- and dicarboxylic acids, preferably acrylic acid, methacrylic acid, fumaric acid and maleic acid; ethylenically unsaturated carboxamides and carbo-nitriles, preferably acrylamide and acrylonitrile; mono- and diesters of fumaric acid and maleic acid, such as the diethyl and diisopropyl esters; and maleic anhydride; ethylenically unsaturated sulfonic acids and their salts, preferably vinylsulfonic acid and 2-acrylamido-2-methylpropanesulfonic acid. Further examples are pre-crosslinked comonomers, such as polyethylenically unsaturated comonomers, for example divinyl adipate, diallyl maleate, allyl methacrylate or triallyl cyanurate, or postcrosslinked comonomers, for example acrylamidoglycolic acid (AGA), methyl methacrylamidoglycolate (MAGME), N-methylolacrylamide (NMA), N-methylolmethacrylamide, N-methylolallyl-carbamate, alkyl ethers, such as isobutoxy ether, or esters of N-methylolacrylamide, of N-methylolmethacrylamide and of N-methylolallylcarbamate. Further examples are comonomers having silicon functional groups, such as acryloyloxypropyltri(alkoxy)- and methacryloyloxypropyltri(alkoxy)silanes or vinyltrialkoxysilanes and vinylmethyldialkoxysilanes, it being possible, for example, for ethoxy and ethoxypropylene glycol ether radicals to be present as alkoxy groups.

Suitable comonomers containing epoxide groups are glycidyl acrylate, glycidyl methacrylate, allyl glycidyl ether, vinyl glycidyl ether, vinylcyclohexene oxide, limonene oxide, myrcene oxide, caryophyllene oxide, styrenes and vinyltoluenes substituted by a glycidyl radical in the aromatic moiety and vinyl benzoates substituted by a glycidyl radical in the aromatic moiety. Glycidyl acrylate, glycidyl methacrylate, allyl glycidyl ether and vinyl glycidyl ether are preferred. Preferably, the amount of the comonomer units having epoxide functional groups is from 0.1 to 5.0% by weight, based on the total weight of the comonomers.

Most preferred are the copolymers mentioned below which also have the above-mentioned comonomer units containing epoxide groups, in the amounts described above. The data in % by weight and the amount of comonomer units containing epoxide groups sum in each case to 100% by weight.

From the group consisting of the vinyl ester polymers:
Vinyl acetate polymers;
vinyl ester/ethylene copolymers, such as vinyl acetate/ethylene copolymers, having an ethylene content of from 1 to 60% by weight;
vinyl esters/ethylene/vinyl chloride copolymers having an ethylene content of from 1 to 40% by weight and a vinyl chloride content of from 20 to 90% by weight, preferably vinyl acetate and/or vinyl propionate and/or one or more copolymerizable vinyl esters, such as vinyl laurate, vinyl pivalate, vinyl 2-ethylhexanoate, vinyl esters of an alpha-branched carboxylic acid, in particular vinyl versatate (VeoVa9$^R$, VeoVa10$^R$), being present as vinyl esters;
vinyl acetate copolymers with from 1 to 50% by weight of one or more copolymerizable vinyl esters, such as vinyl laurate, vinyl pivalate, vinyl 2-ethylhexanoate, vinyl esters of an alpha-branched carboxylic acid, in particular vinyl versatate (VeoVa9$^R$, VeoVa10$^R$), which optionally also contain from 1 to 40% by weight of ethylene;
vinyl ester/acrylate copolymers containing from 30 to 90% by weight of vinyl esters, in particular vinyl acetate, and from 1 to 60% by weight of acrylates, in particular n-butyl acrylate or 2-ethylhexyl acrylate, which optionally also contain from 1 to 40% by weight of ethylene;
vinyl ester/acrylate copolymers containing from 30 to 75% by weight of vinyl acetate, from 1 to 30% by weight of vinyl laurate or vinyl esters of an alpha-branched carboxylic acid, in particular vinyl versatate, and from 1 to 30% by weight of acrylates, in particular n-butyl acrylate or 2-ethylhexyl acrylate, which optionally also contains from 1 to 40% by weight of ethylene.

From the group consisting of the (meth)acrylate polymers:
Copolymers containing n-butyl acrylate and/or 2-ethylhexyl acrylate; copolymers of methyl methacrylate with n-butyl acrylate and/or 2-ethylhexyl acrylate and/or 1,3-butadiene.

From the group consisting of the vinyl chloride polymers, vinyl chloride/ethylene copolymers and vinyl chloride/acrylate copolymers in addition to the above-mentioned vinyl ester/vinyl chloride/ethylene copolymers.

From the group consisting of the styrene polymers, styrene/1,3-butadiene copolymers and styrene/acrylate copolymers, such as styrene/n-butyl acrylate or styrene/2-ethylhexyl acrylate having a styrene content of, in each case, from 1 to 70% by weight.

The epoxide compounds which are not capable of free radical polymerization and have at least two epoxide groups per molecule may be aliphatic, araliphatic or aromatic. Suitable non-copolymerizable compounds having at least two epoxide groups are, for example, those of the bisphenol A type, i.e. condensates of bisphenol A and epichlorohydrin or methylepichlorohydrin. Such epoxide crosslinking agents are commercially available, for example, under the trade names Epicote and Eurepox. Epoxy resins based on bisphenol F, which generally contain a mixture of bisglycidyloxyphenylmethanes, are also suitable. Further examples are aliphatic epoxide compounds, such as glycidyl ethers of aliphatic polyols, in particular butyl diglycidyl ether; cycloaliphatic epoxy resins, such as vinylcyclohexane dioxide, dicylcopentadiene dioxide and 3,4-epoxy-6-methylcyclohexylmethyl; and heterocyclic epoxide compounds, such as triglycidyl isocyanurate.

The epoxide compounds of the bisphenol A type, i.e. condensates of bisphenol A and epichlorohydrin or methylepichlorohydrin, are preferred. The epoxide compounds are present in the polymer composition in an amount of from 1 to 50% by weight, preferably from 1 to 15% by weight, based in each case on the total weight of copolymer A) and epoxide compound B).

The copolymers are prepared by the emulsion polymerization process. This is carried out in an open reaction vessel or in pressure-resistant vessels in a temperature range from 0° C. to 100° C. and is initiated by the methods usually used for emulsion polymerization. The initiation is effected by means of the conventional free radical formers, at least some of which are water-soluble and which are used preferably in amounts from 0.01 to 3.0% by weight, based on the total weight of the monomers. Examples of these are sodium persulfate, hydrogen peroxide, tert-butyl peroxide, tert-butyl hydroperoxide; potassium peroxodiphosphate and azobisisobutyronitrile. If required, said free radical initiators can also be combined in a known manner with from 0.01 to 0.5% by weight, based on the total weight of the monomers, of reducing agents. For example, alkali metal formaldehyde sulfoxylates and ascorbic acid are suitable. In the case of the redox initiation, one or both redox catalyst components are preferably metered during the polymerization.

All emulsifiers usually used in emulsion polymerization may be employed as dispersants. Suitable emulsifiers are anionic, cationic and nonionic emulsifiers. Preferably, the emulsifiers are used in an amount of up to 3% by weight based on the total weight of the monomers. For example, anionic surfactants, such as alkylsulfates having a chain length of 8 to 18 C atoms, alkyl and alkylaryl ether sulfates having 8 to 18 C atoms in the hydrophobic radical and up to 40 ethylene oxide or propylene oxide units, alkanesulfonates or alkylarylsulfonates having 8 to 18 C atoms and esters and monoesters of sulfosuccinic acid with monohydric alcohols or alkylphenols are suitable. Suitable nonionic surfactants are, for example, alkyl polyglycol ethers or alkylaryl polyglycol ethers having 8 to 40 ethylene oxide units.

The preparation is preferably carried out in the presence of protective colloids. Examples of suitable protective colloids are polyvinyl alcohols containing from 75 to 100 mol %, preferably from 78 to 95 mol %, of vinyl alcohol units and having a molecular weight of, preferably, from 5000 to 200,000; polyvinylpyrrolidones having a molecular weight of from 5000 to 400,000; polysaccharides in water-soluble form, such as starches (amylose and amylopectin), celluloses and their carboxymethyl, methyl, hydroxyethyl and hydroxypropyl derivatives, preferably hydroxyethylcelluloses having a degree of substitution of from 1.5 to 3; proteins, such as casein, soybean protein and gelatin; ligninsulfonates, synthetic polymers, such as poly(meth) acrylic acid, poly(meth)acrylamide, polyvinylsulfonic acids and their water-soluble copolymers; melamine formaldehyde sulfonates, naphthalene formaldehyde sulfonates and styrene/maleic acid and vinyl ether/maleic acid copolymers.

The pH range desired for the polymerization, which is generally between 2.5 and 10, preferably between 3 and 8, can be established in a known manner by means of acids, bases and conventional buffer salts, such as alkali metal phosphates or alkali metal carbonates. For establishing the molecular weight, the regulators usually used, for example mercaptans, aldehydes and chlorohydrocarbons, may be used in the polymerization.

Regardless of the polymerization process chosen, the polymerization can be carried out batchwise or continuously, with or without the use of seed latices, initially introducing all or individual components of the reaction mixture, or initially introducing some of them and subsequently metering the or individual components of the reaction mixture, or by the metering method without initial introduction. The epoxide compounds B) not capable of free radical polymerization can be added before, during or after the polymerization of the copolymer A). In the preparation of pulverulent polymer compositions, for example, addition may also be effected during or after the drying of the corresponding polymer dispersion.

In preferred embodiments, the comonomer having epoxide functional groups and the non-copolymerizable epoxide compounds are added before or shortly after the start of the polymerization. It is also preferable if the comonomer having epoxide functional groups is added before or shortly after the start of the reaction while the non-copolymerizable epoxide compound is metered in with the final 5 to 40% by weight of the remaining comonomers. A further preferred embodiment comprises metering in both the comonomer having epoxide functional groups and the non-copolymerizable epoxide compound with the final 5 to 40% by weight of the remaining comonomers. Said variants lead to polymer compositions which, during use, are distinguished in particular by outstanding solvent resistance and lead to polymer compositions which, when used, give water-resistant films.

The solids content of the dispersion thus obtainable is from 20 to 70%. The mean particle size is from 0.1 to 10 mm,. preferably from 0.2 to 5 mm.

The drying of the dispersion can be effected by means of spray-drying, freeze-drying or fluidized-bed drying. Spray-drying in conventional spray-drying units is preferred, it being possible to effect atomization by means of airless high-pressure nozzles, binary nozzles or multi-material nozzles or by means of a rotating disk. The outlet temperature is chosen in general in the range from 55° C. to 100° C., preferably from 65° C. to 90° C., depending on the unit, Tg of the resin and the desired degree of drying.

For spray-drying, the dispersion of the copolymer A) having a solids content of preferably from 20% to 60% is sprayed and dried together with protective colloids as a spraying assistant. Protective colloids which may be used are the above-mentioned ones, it being possible to add the protective colloids to the aqueous dispersion before the spray-drying, in the form of an aqueous solution. In this process step, from 5 to 20% by weight of protective colloid, based on copolymer A), are preferably added.

Optionally, the powder composition may also be modified with further additives. Examples of these are antiblocking agents, dyes, pigments, plasticizers, film formation assistants, antifoams, catalysts, rheology assistants, thickeners, adhesion promoters and emulsifiers, it being necessary to convert them, if they are liquid in the original state, into a pulverulent state prior to admixing.

The dispersion powder composition can be used in the applications typical for them, for example in chemical products for the construction industry in conjunction with inorganic, hydraulically setting binders, such as cements (Portland, alumina, trass, slag, magnesia or phosphate cement), gypsum, waterglass, for the production of construction adhesives, renders, filling compounds, floor filling compounds, joint mortars and paints, and furthermore as sole binders for coating compositions, for example emulsion paints and powder coatings, and as sole binders in adhesives, for example for wood, board, paper and fiber materials, in particular in wood adhesives, parquet adhesives, packaging adhesives and bookbinding adhesives. A further use is as a binder for textiles and paper.

For these applications, the dispersions or powders can be modified with the corresponding additives. Suitable additives are fillers, such as chalk or gypsum. Wetting agents, dispersants, thickeners, antifoams and/or preservatives may furthermore be added.

The Examples below serve for further explanation of the invention:

EXAMPLE 1

3.26 kg of demineralized water, 2.33 kg of a 20% strength polyvinyl alcohol solution (Höppler viscosity: 4 mPas; degree of hydrolysis: 140), 675 g of vinyl acetate and 1.65 kg of ethylene were initially introduced under nitrogen into a 16 l autoclave. The stirrer speed was set at 300 rpm and the mixture was heated to 50° C. The catalyst solutions, a 4% strength sodium formaldehyde sulfoxylate solution and a 6% strength sodium persulfate solution were then run in. 15 minutes later, the vinyl acetate metering (3.95 kg) were started. During the final 900 g of vinyl acetate, 170 g of glycidyl methacrylate were mixed in. The total metering time was 4 hours.

A dispersion having the following data resulted:
Solids content=50.6%; pH=6.7 (about 5 during the polymerization); Brookfield viscosity (20 rpm)=180 mPas; K value=111.8; MFT=−0.5° C.; Tg=−7° C.

For the preparation of a polymer powder redispersible in water, the dispersion was dried in a Nubilosa spray-dryer which was equipped with a binary nozzle, at an outlet temperature of 90° C. Before the drying process, 8% by weight, based on solids content, of polyvinyl alcohol (Höppler viscosity: 4 mPas; degree of hydrolysis: 140) were added to the dispersion, and 240 g of epoxy resin (Epicote 828) in the form of an emulsion were mixed in prior to spraying. Finally, 11% by weight of aluminum silicate were added as an antiblocking agent to the powder.

Comparative Example 1

For the preparation of the powder, polymerization was effected analogously to Example 1, except that no epoxy resin was mixed with the dispersion to be sprayed.

EXAMPLE 2

The procedure was as in Example 1, except that the glycidyl methacrylate was mixed into the total amount of vinyl acetate to be metered.
A dispersion having the following data resulted:
Solids content=50.8%; pH=6.5 (about 5 during the polymerization); Brookfield viscosity (20 rpm)=194 mPas; K value=106.5; MFT=0° C.; Tg=−8° C.
The powder was prepared analogously to Example 1.

EXAMPLE 3

The procedure was as in Example 1, except that 160 g of glycidyl methacrylate and additionally 240 g of an epoxy resin (Epicote 828) were metered in with the final 900 ml of vinyl acetate.

A dispersion having the following data resulted:
Solids content=51.2%; pH=6.4 (about 5 during the polymerization); Brookfield viscosity (20 rpm)=224 mPas; K value=112; MFT=<0° C.; Tg=−3° C.

The powder was prepared analogously to Example 1, except that no epoxy resin was mixed in prior to spraying.

EXAMPLE 4

The procedure was as in Example 1, except that 240 g of an epoxy resin (Epicote 828) were metered with the first 3 kg of vinyl acetate and 160 g of glycidyl meth acrylate with the final 900 g of vinyl acetate.

A dispersion having the following data resulted:
Solids content=48%; pH=6.6 (about 5 during the polymerization); Brookfield viscosity (20 rpm)=740 mPas; K value=117; MFT=<0° C.; Tg=−1° C.

The powder was prepared analogously to Example 1, except that no epoxy resin was mixed in prior to spraying.

EXAMPLE 5

The procedure was as in Example 4, in contrast to Example 4 twice the amount, i.e. 480 g, of epoxy resin (Epicote 828) being metered in.

A dispersion having the following data resulted:
Solids content=50.6%; pH=6.4 (about 5 during the polymerization); Brookfield viscosity (20 rpm)=915 mPas; MFT=<0° C.; Tg=−2° C.

The powder was prepared analogously to Example 4.

In order to test the adhesive properties, the dispersion powders were processed in the following tile adhesive formulation. For this purpose, the dry components were initially introduced into a mortar mixer, the amount of water was added and the mixture was then stirred.

Tile Adhesive Formation
- 350 parts by weight of cement
- 58 parts by weight of quartz sand No. 9a
- 578 parts by weight of quartz sand No. 12
- 4 parts by weight of thickener
- 10 parts by weight of dispersion powder
- 240 parts by weight of water Determination of the Adhesive Strengths In order to test the adhesive strength, the tile adhesives were applied to concrete slabs using a 5 mm serrated spreader. Thereafter 5×5 $cm^2$ stoneware tiles were laid and were weighted with a 2 kg weight for 30 seconds. The tiles were then stored under the following conditions under DIN CEN 1897:

A: 28 days under standard temperature and humidity conditions (DIN 50014, 23° C., 50% relative humidity).

B: 7 days under standard temperature and humidity conditions and 21 days wet storage in water (20° C.)

C: 14 days under standard temperature and humidity conditions, 14 days in a drying oven at 70° C. and 1 day under standard temperature and humidity conditions.

The adhesive strength was determined according to DIN 18156 after the storage using a pull-off device from Herion with a load increasing at a rate of 250 N/s. The measured values in $N/mm^2$ are shown in Table 1 and are mean values of 5 measurements. K1=Break in the adhesive close to the tile; K2=Break in the middle of the adhesive; K3=Break close to the substrate.

TABLE 1

| Example | Storage A [$N/mm^2$] | Storage B [$N/mm^2$] | Storage C [$N/mm^2$] |
| --- | --- | --- | --- |
| Example 1 | 1.68 K1/K3 | 0.96 K1 | 1.74 K1/K3 |
| Example 4 | 1.84 K1/K3 | 0.95 K1 | 2.12 K1/K3 |
| Comp.Expl.1 | 0.99 K1/K2 | 0.55 K1 | 0.93 K1/K3 |

When the epoxy resin is added to the polymer composition (Examples 1 and 4), adhesives having substantially better adhesive strength than epoxy resin-free polymer compositions (Comparative Example 1) are obtained. Particularly in the case of addition of the epoxy resin during the polymerization (Example 4), the adhesive strength after wet storage (storage A) is substantially improved compared with the subsequent addition (Example 1).

We claim:

1. A crosslinkable polymer composition in the form of a redispersible polymer powder, said polymer composition comprising
   (A) a copolymer of one or more comonomers selected from the group consisting of vinyl esters of straight-chain or branched alkanecarboxylic acids having 1 to 18 C atoms, acrylates or methacrylates of branched or straight-chain alcohols having 1 to 15 C atoms, dienes, olefins, vinylaromatics and vinyl halides, and from 0.1 to 10% by weight, based on the total weight of the comonomers, of one or more ethylenically unsaturated comonomers containing epoxide groups, and
   (B) one or more compounds having at least two epoxide groups and free of ethylenic unsaturation.

2. The crosslinkable polymer composition of claim 1, wherein the ethylenically unsaturated comonomers containing epoxide groups are one or more selected from the group consisting of glycidyl acrylate, glycidyl methacrylate, allyl glycidyl ether, vinyl glycidyl ether, vinylcyclohexene oxide, limonene oxide, myrcene oxide, caryophyllene oxide, styrenes and vinyltoluenes substituted by a glycidyl radical in the aromatic moiety, and vinylbenzoates substituted by a glycidyl radical in the aromatic moiety.

3. The crosslinkable polymer composition of claim 1, wherein the compounds B) having at least two epoxide groups per molecule are one or more selected from the group consisting of bisphenol A epoxy resins, bisphenol F epoxy resins, glycidyl ethers of aliphatic polyols, cycloaliphatic epoxy resins and heterocyclic epoxide compounds.

4. The crosslinkable polymer composition of claim 1, wherein the epoxide compounds B) are present in the polymer composition in an amount of from 1 to 50% by weight, based on the total weight of A) and B).

5. A process for the preparation of the redispersible polymer powder of claim 1, said process comprising
   a) emulsion polymerizing one or more comonomers selected from the group consisting of vinyl esters of straight-chain or branched alkylcarboxylic acids having 1 to 18 C atoms, acrylates or methacrylates of branched or straight-chain alcohols having 1 to 15 C atoms, dienes, olefins, vinylaromatics and vinyl halides, and of from 0.1 to 10% by weight, based on the total weight of the comonomers, of one or more ethylenically unsaturated comonomers containing epoxide groups,
   b) adding one or more compounds having at least two epoxy groups and free of ethylenic unsaturation, said step of adding taking place before said emulsion polymerizing, during said emulsion polymerizing, after said emulsion polymerizing, or any combination thereof, and c) spray drying the product obtained from steps (a) and (b) to form a redispersible polymer powder.

6. A crosslinkable polymer composition in the form of an aqueous polymer dispersion or a redispersible polymer powder prepared therefrom, said crosslinkable polymer composition comprising
   (A) a copolymer of one or more comonomers selected from the group consisting of vinyl esters of straight-chain or branched alkanecarboxylic acids having 1 to 18 C atoms, acrylates or methacrylates of branched or straight-chain alcohols having 1 to 15 C atoms, dienes, olefins, vinylaromatics and vinyl halides, and from 0.1 to 10% by weight, based on the total weight of the comonomers, of one or more ethylenically unsaturated comonomers containing epoxide groups, and
   (B) one or more compounds having at least two epoxide groups and free of ethylenic unsaturation, and
   (C) at least one protective colloid.

7. The crosslinkable polymer composition of claim 6, wherein the comonomers containing epoxide groups are one or more selected from the group consisting of glycidyl acrylate, glycidyl methacrylate, allyl glycidyl ether, vinyl glycidyl ether, vinylcyclohexene oxide, limonene oxide, myrcene oxide, caryophyllene oxide, styrenes and vinyltoluenes substituted by a glycidyl radical in the aromatic moiety, and vinylbenzoates substituted by a glycidyl radical in the aromatic moiety.

8. The crosslinkable polymer composition of claim 6, wherein the epoxide compounds B) having at least two epoxide groups per molecule are one or more selected from the group consisting of bisphenol A epoxy resins, bisphenol F epoxy resins, glycidyl ethers of aliphatic polyols, cycloaliphatic epoxy resins and heterocyclic epoxide compounds.

9. The crosslinkable polymer composition of claim 6, wherein the compounds B) are present in the polymer composition in an amount of from 1 to 50% by weight, based on the total weight of A) and B).

10. A process for the preparation of the crosslinkable polymer composition of claim 6, said process comprising
   a) emulsion polymerizing one or more comonomers selected from the group consisting of vinyl esters of straight-chain or branched alkylcarboxylic acids having 1 to 18 C atoms, acrylates or methacrylates of branched or straight-chain alcohols having 1 to 15 C atoms, dienes, olefins, vinylaromatics and vinyl halides, and of from 0.1 to 10% by weight, based on the total weight of the comonomers, of one or more ethylenically unsaturated comonomers containing epoxide groups, and,
   b) adding one or more compounds having at least two epoxy groups and free of ethylenic unsaturation, before said emulsion polymerizing, during said emulsion polymerizing, after said emulsion polymerizing, or any combination thereof,
   c) adding at least one protective colloid to from a protective colloid-containing aqueous polymer dispersion, and
   d) if said crosslinkable polymer composition is a redispersible polymer powder, spray drying said protective colloid-containing aqueous polymer dispersion,
wherein said protective colloid is added at any stage prior to spray drying.

11. The process of claim 5, wherein said compound having at least two epoxy groups is added following completion of said step of emulsion polymerizing.

12. The process of claim 10, wherein said compound having at least two epoxy groups is added following completion of said step of emulsion polymerizing.

13. The process of claim 5, wherein said comonomer containing epoxy groups and said compound having at least two epoxy groups are both added to said step of emulsion polymerizing together with the final 5 to 40 weight percent of the non-epoxy functional comonomers.

14. The process of claim 10, wherein said comonomer containing epoxy groups and said compound having at least two epoxy groups are both added to said step of emulsion polymerizing together with the final 5 to 40 weight percent of the non-epoxy functional comonomers.

15. The process of claim 5, wherein said compound having two or more epoxy groups is added during or after spray drying.

16. The process of claim 10, wherein said compound having two or more epoxy groups is added during or after spray drying.

17. A product for the construction industry selected from the group consisting of inorganic hydraulically setting binders, cements, gypsum, and waterglass, said product further comprising the crosslinkable polymer composition of claim 1.

18. A product for the construction industry selected from the group consisting of inorganic hydraulically setting binders, cements, gypsum, and waterglass, said product further comprising the crosslinkable polymer composition of claim 6.

19. A product for the construction industry selected from the group consisting of inorganic hydraulically setting binders, cements, gypsum, and waterglass, said product further comprising the crosslinkable polymer composition prepared by the process of claim 5.

20. A product for the construction industry selected from the group consisting of inorganic hydraulically setting binders, cements, gypsum, and waterglass, said product further comprising the crosslinkable polymer composition prepared by the process of claim 5.

21. A product for the construction industry selected from the group consisting of inorganic hydraulically binders, cements, gypsum, and waterglass, said product further comprising the crosslinkable polymer composition prepared by the process of claim 19.

22. A product for the construction industry selected from the group consisting of inorganic hydraulically binders, cements, gypsum, and waterglass, said product further comprising a crosslinkable polymer composition in the form of its aqueous polymer dispersion or polymer powder redispersible in water, comprising
   (A) a copolymer of one or more comonomers selected from the group consisting of vinyl esters of straight-chain or branched alkanecarboxylic acids having 1 to 18 C atoms, acrylates or methacrylates of branched or straight-chain alcohols having 1 to 15 C atoms, dienes, olefins, vinylaromatics and vinyl halides, and from 0.1 to 10% by weight, based on the total weight of the comonomers, of one or more ethylenically unsaturated comonomers containing epoxide groups, and
   (B) one or more compounds having at least two epoxide groups and free of ethylenic unsaturation.

23. In a render, filling compound, or joint mortar, wherein a polymer dispersion is added to an inorganic binder, the improvement comprising adding as at least a portion of said polymer dispersion the polymer dispersion of claim 1.

24. In a render, filling compound, or joint mortar, wherein a polymer dispersion is added to an inorganic binder, the improvement comprising adding as at least a portion of said polymer dispersion the polymer dispersion of claim 6.

25. A product containing at least one of paper material or textile material, further comprising a crosslinkable polymer composition in the form of its aqueous polymer dispersion or polymer powder redispersible in water, comprising (A) a copolymer of one or more comonomers selected from the group consisting of vinyl esters of straight-chain or branched alkanecarboxylic acids having 1 to 18 C atoms, acrylates or methacrylates of branched or straight-chain alcohols having 1 to 15 C atoms, dienes, olefins, vinylaromatics and vinyl halides, and from 0.1 to 10% by weight, based on the total weight of the comonomers, of one or more ethylenically unsaturated comonomers containing epoxide groups, and (B) one or more compounds having at least two epoxide groups and free of ethylenic unsaturation.

26. A product containing at least one of paper material or textile material, further comprising a dispersion polymer of claim 1.

27. A product containing at least one of paper material or textile material, further comprising a dispersion polymer of claim 6.

* * * * *

UNITED STATES PATENT AND TRADEMARK OFFICE
CERTIFICATE OF CORRECTION

PATENT NO. : 6,534,177 B2  Page 1 of 1
DATED : March 18, 2003
INVENTOR(S) : Klaus Kohlhammer et al.

It is certified that error appears in the above-identified patent and that said Letters Patent is hereby corrected as shown below:

<u>Column 9,</u>
Line 54, delete "from" and insert therefor -- form --.

<u>Column 10,</u>
Lines 37 and 42, after "hydraulically" insert -- setting --.
Line 40, delete "19" and insert therefor -- 27 --.

Signed and Sealed this

Nineteenth Day of August, 2003

JAMES E. ROGAN
*Director of the United States Patent and Trademark Office*